United States Patent [19]

Fiege

[11] Patent Number: 4,601,170
[45] Date of Patent: Jul. 22, 1986

[54] EXPLOSIVE EVAPORATION MOTOR

[76] Inventor: Robert K. Fiege, 150 Greenway Trail, Carol Stream, Ill. 60188

[21] Appl. No.: 568,433

[22] Filed: Apr. 3, 1984

[51] Int. Cl.⁴ .................................. F01B 29/00
[52] U.S. Cl. ............................. 60/513; 60/670
[58] Field of Search ............ 60/513, 514, 669, 670

[56] References Cited

U.S. PATENT DOCUMENTS

| | | | |
|---|---|---|---|
| 1,226,500 | 5/1917 | Fuehler | 60/670 X |
| 1,232,083 | 7/1917 | Ranft | 60/514 |
| 1,290,966 | 1/1919 | Garland | 60/513 |
| 3,609,965 | 10/1971 | Hercher | 60/513 |

Primary Examiner—Stephen F. Husar
Attorney, Agent, or Firm—Edmond T. Patnaude

[57] ABSTRACT

The invention is similar to the internal combustion engine but instead it uses pressure. The power for a propulsion derives from the expansion of compressed steam (salt free water) and needs no air intake.

1 Claim, 2 Drawing Figures

EXPLOSIVE EVAPORATION MOTOR

BACKGROUND OF THE INVENTION

The ideas of various numbers of combustion motors based on steam power have been patented.

Each patented steam motor so far has an additional second injection system for gas, diesel, hydrogen, etc. This in the following described motor runs on fresh water (no addition of any kind of chemical solution.)

Besides lubrication grease for the movable parts no other chemical substances are used. This type of motor needs no air intake, its exhaust is nothing but steam.

BRIEF SUMMARY OF INVENTION

It is already demonstrated that a combustion Otto, Diesel and a two(2) cycle motor using "Fresh Water" (free of all kinds of chemicals including salt) and without air injection being able to produce the same amount of power like the conventional types of motors and its used fuel.

The technical calculation is based on a piston head having a diameter of 100 millimeters which provides a piston area of 78.54 square centimeters.

During the upward movement (compression phase) of the piston the temperature rises due to compression to 350°-400° C. (660°-750° F.). Due to preheating by means of the glowing filament the compression chamber temperature rises an additional 200° C. (395° F.) which totals up to 550° C. (1025° F.). This temperature level is well above the critical point of water which converts the injected water spray into gas transforming due to a sudden expansion (by means of explosion) power on to the piston.

The power per square centimeter ($cm^2$) equals 5–63 bar/kg. At a piston head surface of 100 mm $\phi$ or 78.54 $cm^2$ equals an energy conversion of $78.54 \times 63 = 4948$ kg. During the phase of compression an additional 30 $kg/cm^2$ is created. This adds as an amplification factor.

Just using the factor two(2) it adds up to 126 ($63 \times 2$) equals to $78.54 \times 126 = 9896$ kg. Subtracting compression loss due to friction (30 $kg/cm^2$, $-78.54 \times 30 = 2626$ kg) which totals the actual transformed energy onto the piston head up to 7270 kg.

The energy factor of the injected and transformed water into steam/gas is above that of the diesel or gasoline combustion motor. In addition no polluting gas exits which is released into the air via the exhaust system, what is safe for people, animals, plants and forest preserves.

No air intake is needed during the working sequence of the motor. Instead the reduced steam/gas pressure inside the equalizing box can be re-routed into the compression chamber for further usage. The four cycle motor only needs just one (1) valve. Depending upon the position of the piston head it is opened or closed. The size of the installed equalizer box depends on the size of the motor. Any over pressure within the equalizer box is released as exhaust. The released pressure can also be re-used after its temperature has dropped below 50° C. (120° F.).

The two cycle motor uses only one (1) slot as outlet. After reaching the lower dead centre point of the piston only the over pressure is released through the outlet, the remaining steam/gas pressure is used for the next working cycle.

DETAILED DESCRIPTION

Figure 1:
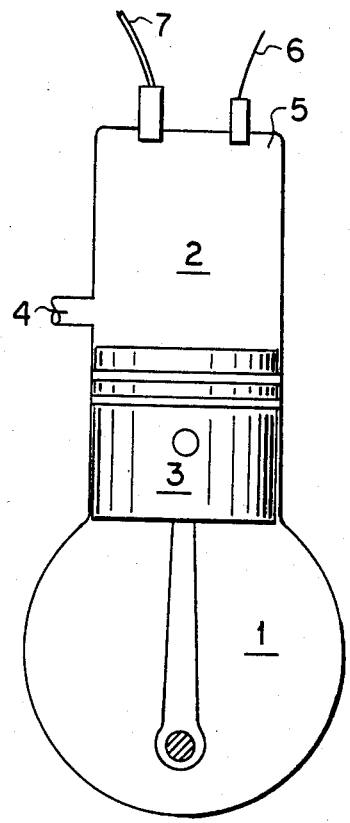
Figure 2:
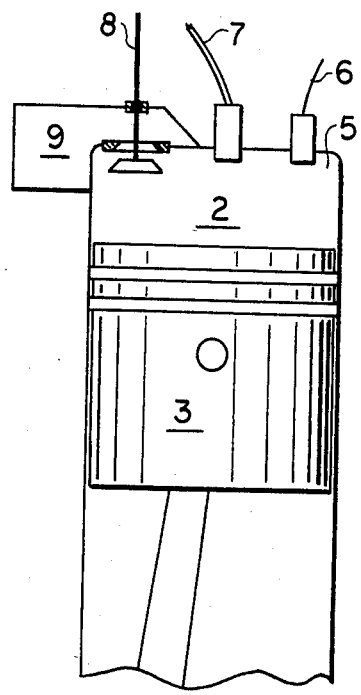

FIG. 1 is a schematic showing of a two-cycle steam engine embodying the present invention; and FIG. 2 is a schematic showing of a four-cycle steam engine embodying the present invention.

In the following the description of the working sequence of a "Steam-Explosion-Motor" is based on the method to use "Fresh Water" (no chemicals or salt is used). The motor is comparable to the known Otto motor, Diesel or two cycle motor in all aspects as far as power is concerned.

The two cycle motor needs no intake of air (oxygen), gasoline or oil as by the known working sequence of a combustion engine. This motor works as follows: (Ref. to FIG. 1)

Before starting the motor the compression chamber (5) is warmed up for about 25 seconds by means of a glowing filament (6). Due to the pre-heating phase the chamber temperature rises up to approx. 200° C.-(365° F.). While compressing upward movement of the piston (3) to its upper dead centre inside the compression chamber the temperature rises up by another 350° C. (660° F.) adding up to a total temperature of 550° C. (1025° F.). The very fine injected water spray, which is injected into the chamber through the injection nozzle 7, is transformed into hot steam/gas and the sudden expansion drives the piston downwards (working cycle). Just before the piston (3) reaches the lower dead center a small slot-outlet (4) becomes open.

The still existing overpressure is released through this outlet (4) via an exhaust system into open air. The exhausted steam is not a pollutant. The remaining steam/gas inside cylinder (2) is used for the next beginning sequence of another compression phase by piston (3). This compression of the remaining steam/gas plus the preheat due to the glowing filament (6) creates again the operating temperature by which the transformed water spray expands onto the piston. The actual working power depends upon the water flow through the injection valve.

The four cycle Otto motor as well as the Diesel engine works on the same basic principle as of now with the exception of instead of using 2 valves each cylinder, only 1 valve each cylinder is needed.

After the piston (3) reaches its lower dead center a valve (8) opens. As soon as the piston starts to move upwards again, it presses expended steam/gas into an isolated equalizer box (9). The box is installed across the inlets and outlets of the motor.

The temperature of the steam/gas inside the isolation box is still above the critical point and is sucked back into the compression chamber (5) as the piston 3 moves back down in the chamber 2. When the piston 3 again moves upwardly during the compression stroke the steam/gas and the water vapor which is injected into the chamber through the injection nozzle 7 is compressed in order to keep the the operating temperature at approx. 550° to 600° C.-(1025° to 1112° F.). This temperature transforms the injected water spray into steam/gas. The precompression of the steam/gas from the equalizer box and the transformed spray creates enough expansion power onto the piston driving it downwards again.

Any kind of overpressure inside the equalizer box gets released via the exhaust system or after being cooled off and recycled into the injection system.

Four cycle combustion engines already in use can still be used. The conversion asks for an equalizer box and a new injection system only.

What is claimed:

1. An explosive evaporation motor, comprising in combination a compression chamber having a longitudinal axis, said chamber being sealably closed at one end, a piston disposed in said compression chamber and cyclically movable along said axis between a first end position in proximity to said one end and a second end position remote from said one end of said chamber and from said first position, means for heating said compression chamber to at least a preselected temperature, means for injecting water vapor into said chamber between said piston and said one end of said chamber when said piston is at said first position, whereby said vapor is caused to explode and drive said piston toward said second position, exhaust port means opening into said chamber for exhausting gas from said chamber when said piston is at said second position, said compression chamber and said piston being constructed so as to prevent the introduction of gas into said chamber as said piston moves from said second position to said first position, said chamber includes a cylindrical end wall and an end wall, said exhaust port means comprises an opening in said end wall of said compression chamber, valve means for closing said opening except when said piston is in proximity to said second position, and sealably closed chamber communicating with said opening.

* * * * *